United States Patent
Ratcliffe

[15] 3,650,047
[45] Mar. 21, 1972

[54] DEVICE FOR USE IN DRIVING INSTRUCTION

[72] Inventor: George Dennis Ratcliffe, 43 Northhampton Road, Addiscombe, Croydon, Surrey CRO 7HD, England

[22] Filed: Dec. 24, 1969

[21] Appl. No.: 888,009

[30] Foreign Application Priority Data

Dec. 24, 1968 Great Britain..................61,467/68
Jan. 17, 1969 Great Britain........................3,000/69

[52] U.S. Cl..................................................35/11
[51] Int. Cl........................................G09b 9/04
[58] Field of Search............35/11; 116/31; 74/552, 558, .5; 46/1 B; 40/129 B, 125 M; 280/150 A

[56] References Cited

UNITED STATES PATENTS 1,922,746  8/1933  Reeder.......................35/11 X

Primary Examiner—Wm. H. Grieb
Attorney—Waters, Roditi, Schwartz & Nissen

[57] ABSTRACT

A device for use in driver instruction, intended to be used in combination with a steering wheel, the device comprising stops that prevent a user's hands from passing through upper and lower regions of the wheel while gripping the wheel. A preferred embodiment comprises a plate having instructions for the use of the device and correct steering printed thereon.

5 Claims, 2 Drawing Figures

PATENTED MAR 21 1972

3,650,047

DEVICE FOR USE IN DRIVING INSTRUCTION

This invention relates to devices for use in driving instruction.

In driving instruction, there is often encountered the tendency on the part of the pupil to cross his hands over while turning the steering wheel of the car, particularly while negotiating a sharp turn. This habit is best eliminated, but most people require several lessons to stop this tendency. The invention provides a simple and robust device that may either fitted to a motor car, preferably with the front axle jacked up, or may be fitted to a device as claimed in my co-pending U.S. Pat. application No. 888,008 filed Dec. 24, 1969. It has been found that, using this device, the tendency to cross hands over the steering wheel can be completely eliminated whilst the basic movements of steering are assimilated.

According to the invention there is provided a device comprising a member arranged to occupy fixed positions close to the upper and lower regions of the steering wheel in such a way that said member prevent the hands of a user of the steering wheel from moving through said regions while gripping the wheel.

Figure 1:
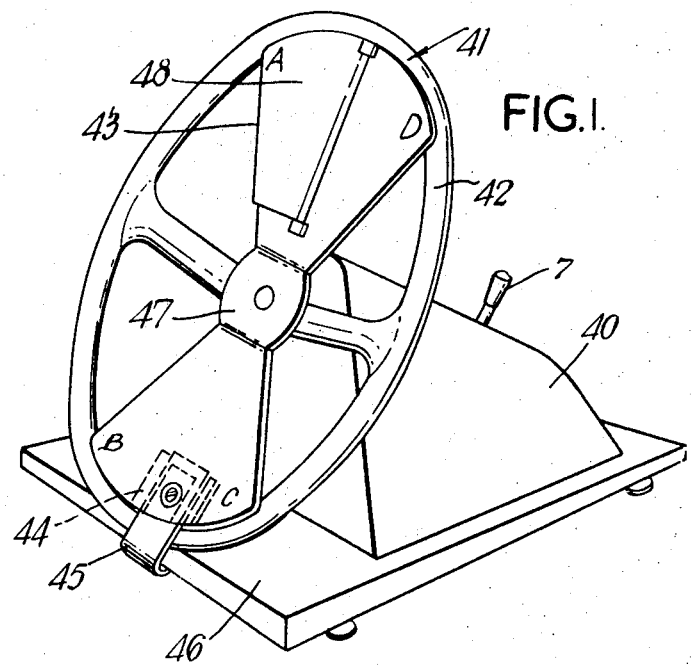
Figure 2:
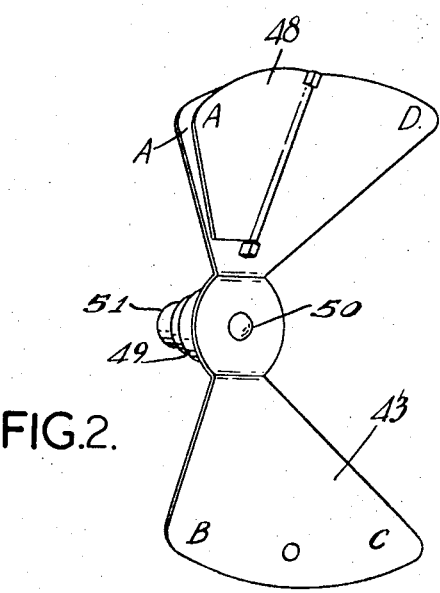

For a better understanding of the invention, and to show how the same may be carried into effect, reference will now be made, by way of example, to the accompanying drawings, in which:

FIG. 1 is a perspective view of a device for use in driving instruction or physiotherapy, and FIG. 2 is a perspective view, to an enlarged scale, of a device according to the invention.

There is shown in the FIGS. a device for positively preventing the pupil crossing his hands over on the steering wheel. This device, generally designated 41, takes the form of a plate 43 mounted on a steering wheel 42, the upper and lower regions of which plate 43 afford stops that occupy fixed positions closely in front of corresponding regions of the wheel 42. At one end of the plate 43 is located a bracket 44 for securing the plate 43 to same fixed member of the device to which the invention is an attachment such as the base 46 of the portable device shown. To add rigidity to the plate 43 it may have at its centre 47 a bearing in order to rotatably attach it to the hub of the steering wheel 42. This bearing may take the form of a ball race mounted in the hub of the wheel 42. The centre of the plate 43 has mounted thereon a cylinder 49 made of rubber or other resilient material by means of a bolt 50 extending through the cylinder and threaded into a washer 51 of area slightly less than that of the cylinder. The cylinder 49 is then inserted into the ball race and the bolt 50 tightened. This draws the washer 51 towards the plate 43 which in turn compresses the cylinder 49 longitudinally. The cylinder 49 thus expands radially and grips the inside of the ball race, forming a simple and reliable bearing for the plate. The device on which the steering wheel 42 is mounted is of the type described in my copending U.S. Pat. application No. 888,008. It consists of an axle having a brake thereon whose force can be varied by means of a lever 7. It has also means for providing some return of the wheel under spring pressure, in order to simulate the feel of steering a motor vehicle. It is portable and is designed to be placed on a desk or table for use. The device is mounted on a base 46 and has a casing 40 surrounding the moving parts.

Hingedly mounted on the upper half of the plate 43 is a flap 48 which may be left lying either to the right or to the left of the hinge. On one side of the plate 43, and on the side of the flap 48 which will be exposed when the first-mentioned side of the plate 43 is exposed, are printed instructions for the use of the device, a different set of instructions being printed on the other sides. The corners of the plate 43 are designated A, B, C, and D, and the instructions may read, for example, as follows:

Place your left hand at A and gently pull the wheel down to B. Stop, and release your grip.
Place your right hand at C and gently push
the wheel up to D. Stop, and release your
grip.
Left hand back to A, pull down to B.
Stop, release grip.
Right hand to C, push up to D.
Stop, release grip.
Left hand to A, pull.
Right hand to C, push.
Left hand, pull.
Right hand, push.
Pull.
Push.
Pull.
Push.

For the right-hand turn the flap 48 is turned over and similar instructions followed.

The device may be used on other training machines or on motor vehicles, and may be made of polymethyl methacrylate or other rigid plastics or non-plastics materials.

Horizontal or substantially horizontal steering wheels are occasionally met with and, in such a case, the terms "upper region" and "lower region" that have been used in this Specification are to be interpreted as meaning a region furthest from, and a region closest to, the operator of the steering wheel respectively.

The portable device is shown in its most basic form but can be modified by adding, for example, an imitation dashboard. The lever 7 can be made to look like, but not to function as, an automobile gear lever, and/or can be calibrated to show at a glance what position it is in. The "dashboard" and "gear lever" modifications add interest for children using the device as a toy or in physiotherapy, in which latter field the invention has many possibilities for people of all ages. When the device is to be employed for either driving instruction or physiotherapy, it may be left at the pupil's home for use by him or her as required.

I claim:

1. A device for use in driving instruction and comprising a pair of stationary stops arranged to occupy fixed positions adjacent the upper and lower regions of a steering wheel, said stops encompassing portions of said wheel, and said stops having a configuration adapted to prevent the hands of the user of the steering wheel from moving through said regions while gripping the wheel.

2. A device as claimed in claim 1, wherein the stops are constituted by a plate supported at the hub of the wheel, a bracket secured to the lower end of the plate preventing rotation of the latter and a fixed member, said plate being connected to said member in the use of the device.

3. A device as claimed in claim 2 including instructions for the use of the device being printed on said plate.

4. A device as claimed in claim 2, including a flap hingedly mounted on the upper half of the plate, said flap being adjustable in two positions in order to disclose different faces as desired.

5. A device as claimed in claim 4 including instructions for the use of the device being printed on, the upper half of the plate and on the flap, the printing arrangement being such that in one position of the flap instructions for one operation are displayed, and in the other position of the flap instructions for a different operation are displayed.

* * * * *